United States Patent
Kikuchi (10) Patent No.: US 8,753,019 B2
(45) Date of Patent: Jun. 17, 2014

(54) TURNING BEARING WITH SEPARATOR

(71) Applicant: Nippon Thompson Co., Ltd., Tokyo (JP)

(72) Inventor: Shunsuke Kikuchi, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/745,128

(22) Filed: Jan. 18, 2013

(65) Prior Publication Data

US 2013/0223783 A1    Aug. 29, 2013

(30) Foreign Application Priority Data

Feb. 6, 2012 (JP) ................. 2012-022910

(51) Int. Cl.
*F16C 19/40* (2006.01)
(52) U.S. Cl.
USPC ..................................................... 384/551
(58) Field of Classification Search
USPC ........... 384/47, 447, 455, 507, 508, 548, 549, 384/551, 559, 569, 619, 622
See application file for complete search history.

(56) References Cited

U.S. PATENT DOCUMENTS

| | | | |
|---|---|---|---|
| 3,275,391 A | | 9/1966 | Blais |
| 4,479,683 A | * | 10/1984 | Kanamaru ............... 384/619 |
| 4,896,974 A | * | 1/1990 | Shimizu ................... 384/47 |
| 5,104,239 A | * | 4/1992 | Sague ...................... 384/448 |
| 5,218,764 A | * | 6/1993 | Suzuki ................. 29/898.066 |
| 7,547,144 B2 | * | 6/2009 | Kunimoto et al. ........ 384/447 |

FOREIGN PATENT DOCUMENTS

| | | |
|---|---|---|
| DE | 19856319 A1 | 6/2000 |
| DE | 102007054555 A1 | 5/2009 |
| DE | 102010012168 A1 | 9/2011 |
| EP | 0764791 A1 | 3/1997 |
| JP | H01156314 U | 10/1989 |
| JP | 2000291668 A | 10/2000 |
| JP | 2000314418 A | 11/2000 |
| JP | 2002013540 A | 1/2002 |
| JP | 2009047206 A | 3/2009 |
| WO | 2009020087 A1 | 2/2009 |

OTHER PUBLICATIONS

European Search Report corresponding with application No. 13154011.4-1758, Jul. 6, 2013.

* cited by examiner

*Primary Examiner* — Phillip A Johnson
(74) *Attorney, Agent, or Firm* — Browdy and Neimark, PLLC (57) ABSTRACT

The turning bearing has a separator whose leading and trailing sides are concaved to fit over circular rolling surfaces of the rollers to provide concavities where concaved surfaces lying either in parallel with and in perpendicular to the axis of the roller. The rollers fit in the separator in either of two different directions. The separator can be easier installed into the raceway through a loading hole without the posture of the separator in mind. The separator has a quadrilateral in a transverse cross-section perpendicular to a traveling direction of the separator of which a peripheral surface is in opposition to the outer ring and the inner ring. The separator has a center through-hole. The concaved surfaces in the separator are contoured in arced or curved profiles and bulge gradually closer to a circular edge of the through-hole to form arcing bulges at bottoms of the curved surfaces.

6 Claims, 10 Drawing Sheets

(PRIOR ART)

FIG.14

(PRIOR ART)

FIG.15

(PRIOR ART)

FIG.16

(PRIOR ART)

FIG.17

(PRIOR ART)

TURNING BEARING WITH SEPARATOR

FIELD OF THE INVENTION

The present invention relates to a turning bearing or swivel bearing suitable for use in a turning or pivotal component installed in, for example a variety of assembling machines, machine tools, industrial robots, semiconductor fabricating equipment.

BACKGROUND OF THE INVENTION

An international publication No. WO 2009/020087 discloses an example of the double-row roller bearing, which is composed of an outer ring whose inside circular surface has two rows of outside grooved tracks, or races, extending circumferentially of the outer ring, an inner ring whose inside circular surface has two rows of inside grooved races extending circumferentially of the inner ring in opposition to the outside grooved races of the outer ring to define raceways between the outside grooved races and inside grooved races, and a plurality of rollers lying in the raceways so as to circulate through the raceways with carrying loads as the inner ring and the outer ring rotate relative to each other. With the outside and inside grooved races, the race surfaces on which the rollers roll through intersect with skew regulator surfaces to form a substantially V-shape in a transverse cross-section. The skew regulator surfaces face to axially opposite ends of the rollers with leaving minute clearances between them. On the skew regulator surfaces on the outside grooved races, moreover, there are each provided a circular ridge flanked by annular recesses extending circumferentially of the inside circular surface of the outer ring, the circular ridge lying in opposition to a rotation axis of the roller. On the skew regulator surfaces on the inside grooved races, there are each provided a circular ridge flanked by annular recesses extending circumferentially of the outside circular surface of the inner ring, the circular ridge lying in opposition to a rotating axis of the roller. Furthermore, the outer ring has passages extending radially from the floors of the outer grooved races to release lubricant.

Figure 15:
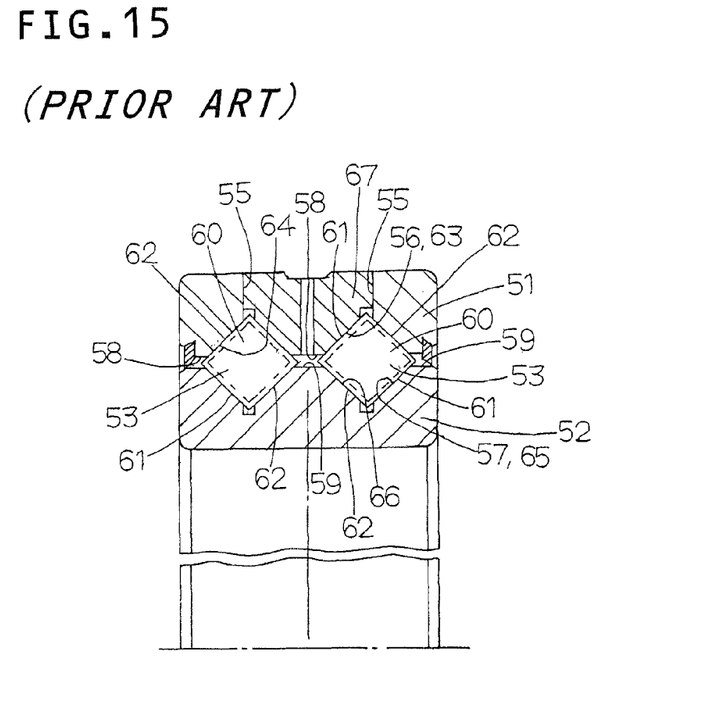
FIG. 15 is a view in transverse cross-section showing a prior double-row roller bearing in which the rollers roll through the raceways defined between the grooved races cut in the circular inside surface of the outer ring and the grooved races cut in the circular outside surface of the inner ring.
Figure 16:
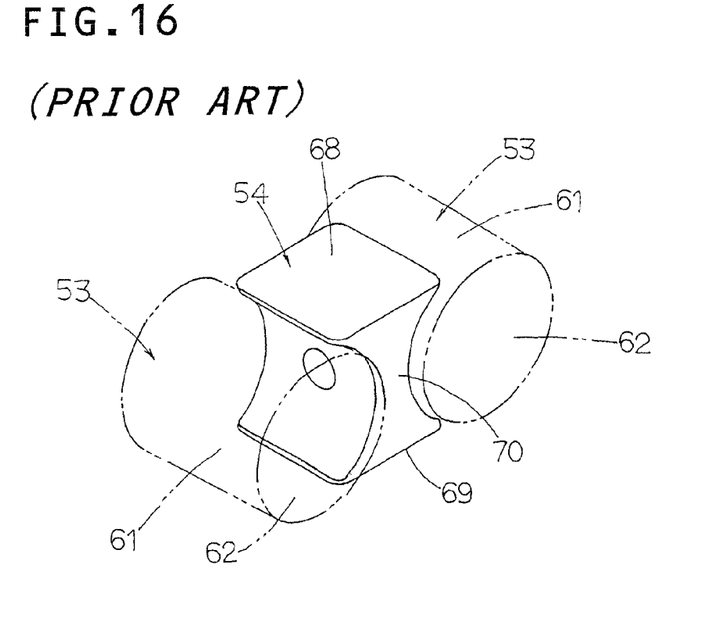
FIG. 16 is a view in perspective showing a prior separator lying between the rollers in the prior double-row roller bearing of FIG. 15.

Of some commonly-assigned Japanese patent applications concerned with roller bearings, the commonly-assigned Japanese Laid-Open Patent Application 2000-314 418 discloses an angular-contact roller bearing constructed as shown in FIGS. 15 and 16 to make assemblage as well as downsizing easier. With the prior angular-contact roller bearing as shown in FIG. 15, two rows of raceways 60 are formed between an outer ring 51 and an inner ring 52, and the rollers 53 are disposed in the raceways 60 in such a fashion that their rotation axes are tilted or askew with respect to a rotating shaft to support the outer ring 51 and the inner ring 52 for rotation. The outer ring 51 has a loading hole 55 to charge the rollers 53 into the raceways 60 through there. The loading hole 55 is closed with a plug 67 after the completion of introduction of the rollers 53 into the raceways 60. With an inside circular surface 58 of the outer ring 51, there is no difference or gap in level on opposite sides of the outside grooved race 56. With an outside circular surface 59 of the inner ring 52 as well, there is no difference or gap in level on opposite sides of the inside grooved race 57. Both the outside grooved race 56 and the inside grooved race 57 have a V-shape in a transverse cross-section, whose one sides are race surfaces 63 and 65 coming into rolling contact with the circular rolling surfaces 61 of the rollers 53 and whose the other sides are guide surfaces 64 and 66 born against the axially opposite ends 62 of the rollers 53. The race surfaces 63 and 65 and the guide surfaces 64 and 66 are made identical in configuration with each other. The angular-contact roller bearing constructed as stated earlier, moreover, has separators 54 each of which is interposed between any adjacent rollers 53 lying between the grooved races 56 and 57 (refer to FIG. 16). The separator 54 as shown in FIG. 16 includes an upper surface 68 and lower surface 69 lying in opposition to race surfaces 63 and 68 of the races, along which the rollers 53 roll through, with leaving slight clearances to keep the upper and lower surfaces 68, 69 apart from the race surfaces 63 and 68, a major column 70 joining the upper and lower surfaces 68 and 69 together, and edge surfaces lying in opposition to guide surfaces of the races, against which the axially opposite ends 62 of the rollers 53 are opposed, with leaving slight clearances to keep the edge surfaces apart from the guide surfaces. The separator 54 has leading and trailing major sides concaved in symmetry with each other to fit over the rollers 53. Moreover, the concaved surfaces on the major sides are contoured in arced or curved profiles that the concaved sides bulge or rise gradually as their concavities get closer towards the centers thereof, so that the rollers 53 are guided while turning, with coming into touch with only the bulged centers in the concaved sides of the separator 54.

Figure 17:
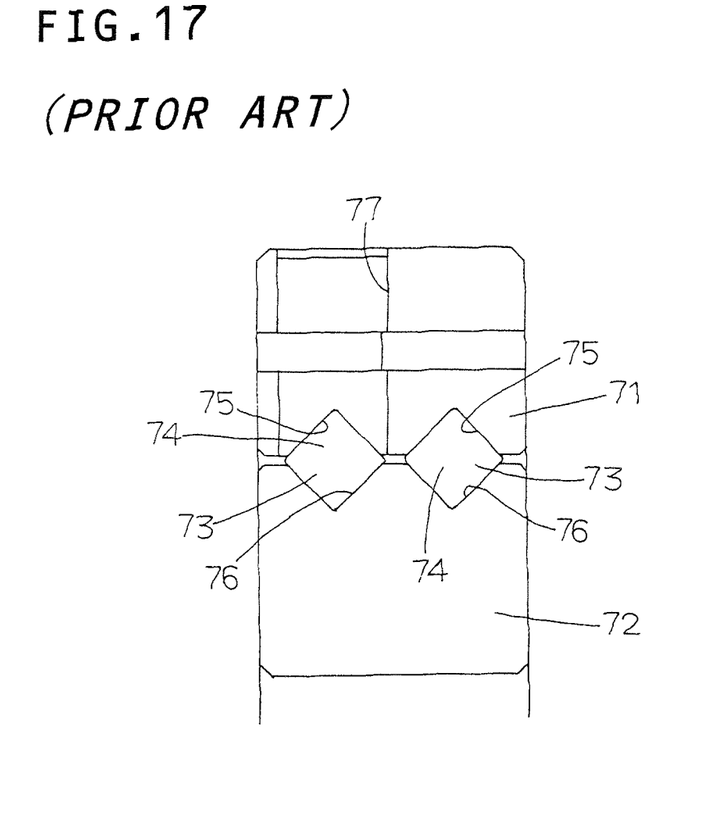
FIG. 17 is a view in transverse cross-section of the prior double-row roller bearing in which the loading hole to throw the rollers into the raceway is made every raceway, one to each raceway.

Another prior double-row turning bearing as shown in FIG. 17 is described in Japanese Laid-Open Patent Application 2002-13 540, in which a plurality of rolling elements of rollers 73 is installed in double rows of raceways 74 defined between an outer ring 71 and an inner ring 72. Especially, the prior double-row turning bearing is composed of the outer ring 71 having an inside circular surface on which double rows of grooved races 75 are formed to extend circumferentially of the inside circular surface, the inner ring 72 placed inside the outer ring 71 and having an outside circular surface on which double rows of grooved races 76 are formed to oppose circumferentially to the grooved races 75 on the outer ring 71, and a plurality of rolling elements 73 installed in double rows of raceways 74 defined between the grooved races on the outer ring and the inner ring. Either of the outer ring 71 and the inner ring 72 has a loading hole 77 on each raceway 74, which extends radially of the ring to make it possible to charge the rolling elements 73 into the raceway 74.

Meanwhile, with the angular-contact roller bearing constructed as recited earlier, the outer ring and the inner ring have plural rows of grooved races and a plurality of rollers are used as rolling elements. Moreover, the grooved races make angular-contact raceways. The loading hole is provided to insert the separators between the adjacent rollers. The separator has belly and back major sides concaved in symmetry with each other to fit over the rollers. Moreover, the concaved surfaces on the major sides are contoured in arced or curved profiles that the concaved sides bulge or rise gradually as their concavities get closer towards the centers thereof, so that the rollers are guided while turning, with coming into touch with only the bulged centers in the concaved sides of the separator. Nevertheless, the concavity on the separator is profiled to fit over the roller in only one restricted direction. With the prior separator, more especially, the surface of the separator born against the circular rolling surface of the roller is fixated on only one direction with respect to the axially opposite ends of the roller. On throwing the rollers and separators into the raceways from the loading hole on either of the outer ring and inner ring to thereby assemble the bearing, the rollers and the separators lying between the adjoining rollers have to be controlled in relative position to take the correct posture in the desired direction. This work poses a problem of requiring much time and effort on assemblage of the bearing.

Figure 13:
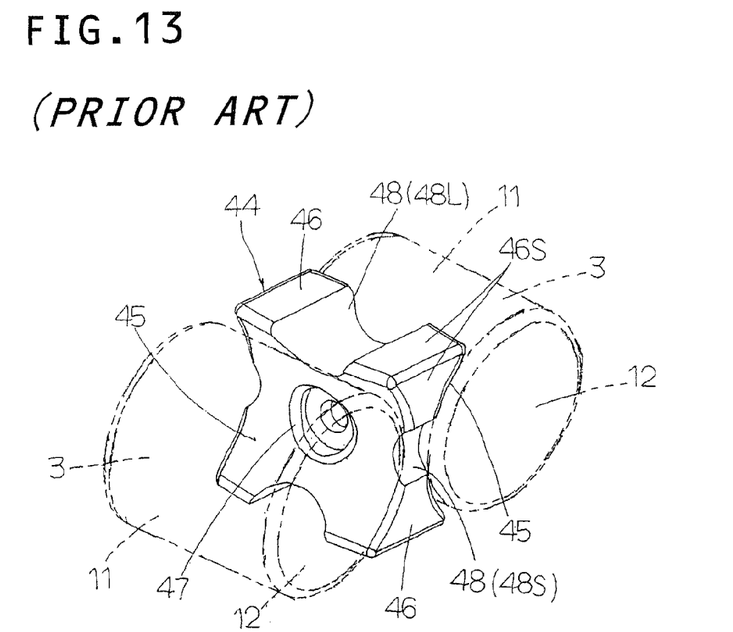
FIG. 13 is a view in perspective showing a prior separator lying between the rollers.

With another prior separator 44 shown in FIG. 13, the concavity 45 born against the circular rolling surface 11 of the roller 3 spreads in only one direction. The separator 44 has a thick body 46 to isolate the adjoining rollers 3 apart away from each other in the traveling direction of the rollers. The thick body 46 has a substantially quadrilateral or square shape defined with four peripheral sides 46S and further has an opening 47 at the center thereof. With the separator 44, moreover, the peripheral sides 46S of the thick body 46 have recesses 48. More especially, major recesses 48L are made on the sides 46S lying in opposition to the race surfaces 13, 15 of the grooved races 6, 7, which make rolling contact with the circular rolling surfaces 11 of the rollers 3. On the other hand, minor recesses 48S are made on the sides 46S lying in opposition to the guide surfaces 14, 16 of the grooved races 6, 7, which make sliding contact with the axially opposite ends of the rollers 3. Thus, careful consideration has been required to control the posture of the separator 44 when the separators 44 were inserted into the raceways from the loading hole of either of the outer ring and inner ring to thereby assemble the bearing.

Figure 14:
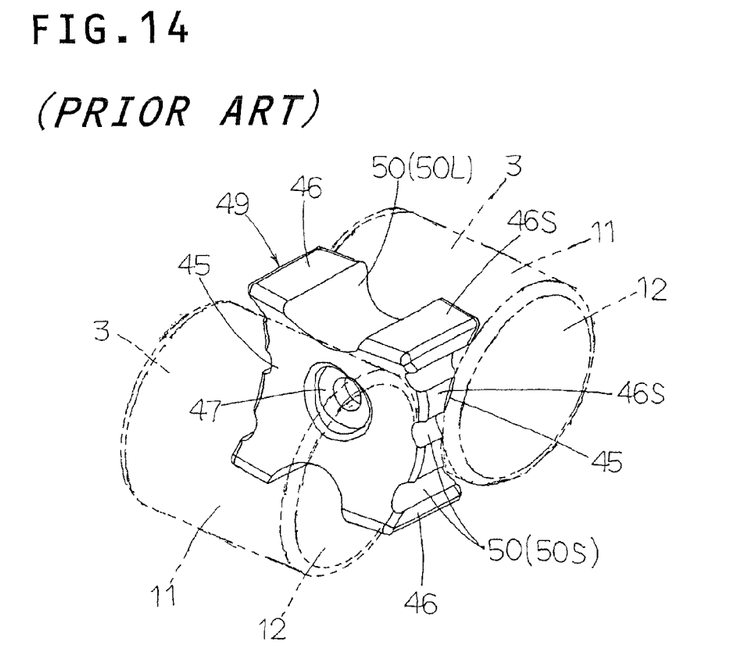
FIG. 14 is a view in perspective showing another prior separator lying as shown in FIG. 13.

With a further another separator 49 shown in FIG. 14, the concavity 45 born against the circular rolling surface 11 of the roller 11 spreads in only one direction as with the concavity shown in FIG. 13. The separator 49 has a thick body 46 to isolate the adjoining rollers 3 apart away from each other in the traveling direction of the rollers. The thick body 46 has a substantially quadrilateral shape surrounded with four peripheral sides 46S and further has an opening 47 at the center thereof. With the separator 49, moreover, the peripheral sides 46S of the thick body 46 have recesses 50. More especially, major recesses 50L are made on the sides 46S lying in opposition to the race surfaces 13, 15 of the grooved races 6, 7, which make rolling contact with the circular rolling surfaces 11 of the rollers 3. On the other hand, there are made three minor recesses 50S on the sides 46S lying in opposition to the guide surfaces 14, 16 of the grooved races 6, 7, which make sliding contact with the axially opposite ends of the rollers 3. Thus, it will be said that this separator 49 has the same problem as in the separator 44 constructed as stated earlier.

SUMMARY OF THE INVENTION

The present invention has as its principal object to overcome the challenges stated earlier. The present invention provides a turning bearing or swivel bearing with a separator which can apply to the cross-roller turning bearing in which the rollers adjacent to each other across a separator tilt alternately in opposite direction to each other in a fashion their axes intersect at right angles, not only to the angular-contact turning bearing in which the rollers adjacent to each other across a separator tilt in the same direction in a fashion their axes lie parallel with each other. More especially, the present invention provides a turning bearing with a separator whose leading side and trailing side are each concaved to fit over a circular rolling surface of the roller so as to thereby provide a concavity where a first concaved surface lying in parallel with an axis of the roller and a second concaved surface lying in perpendicular to the first concaved surface are combined together in a crisscrossed relation. Thus, the separators constructed as stated earlier, even if they have been thrown into a loading hole with turning away over 90 degrees relative to the associated rollers, can be charged or installed in a raceway with keeping their correct posture. As a result that the rollers are allowed to fit in the separator in either of two different directions, the separator can be easier installed into the raceway through the loading hole in either of the outer and inner rings. Thus, high performance in assembling work can be ensured even though the roller is very small in size. In the turning bearing of the present invention, moreover, the separator has a thickness dimension in the traveling direction of the separator enough to make contact between the separator and the roller at the same position, and the raised tops on the leading and trailing sides of the separator are made flat.

The present invention is concerned with a turning bearing comprising, an outer ring provided on an inside circular surface thereof with an outside grooved race, an inside ring provided on an outside circular surface thereof with an inside grooved race in opposition to the outside grooved race of the outer ring, a plurality of rollers lying in a raceway defined between the outside grooved race and the inside grooved race to circulate through the raceway while bearing a load as the outer ring and the inner ring rotate relative to each other, a plurality of separators lying in the raceway in an arrangement interposed between the rollers adjoining each other, and a closure closing a loading hole provided in either of the outer ring and the inner ring for charging the raceway with the rollers and the separators, wherein the separator has a substantially quadrilateral in a transverse cross-section perpendicular to a traveling direction of the separator of which a peripheral surface is in opposition to the outer ring and the inner ring, wherein the separator has a leading side and a trailing side each of which is concaved to fit over a circular rolling surface of the roller to thereby provide concaved surfaces lying either in parallel with and in perpendicular to an axis of the roller, the concaved surfaces being combined together in a crisscrossed relation, the separator having a through-hole extending across the separator at centers of the leading and trailing sides.

The concaved surfaces in the separator are contoured in arced or curved profiles in which the concaved surfaces bulge or rise gradually as getting closer towards a circular edge of the through-hole to form arcing bulges at bottoms of the curved surfaces lying in a crisscrossed relation with each other. In the turning bearing with the separator, moreover, recesses of arced configuration in a transverse cross-section are provided on a peripheral surface extending around the concaved surfaces in the leading and trailing sides of the separator. The through-hole extending between the leading side and trailing side of the separator is larger in diameter at the leading and trailing sides than at other major middle thereof.

With the turning bearing constructed as states earlier, the leading side and trailing side of the separator have at four corners raised portions whose tops are flat. The concaved surface of the separator is narrow about a middle area in the axial direction of the roller which fits into the separator, but radiates outward or splays out towards each of the sides of the quadrilateral to widen near the axially opposite ends of the roller up to an overall dimension of the separator. With turning bearing with the separator constructed as stated earlier, moreover, the outer ring has two rows of the outside grooved race of a V-shape in a transverse cross-section and the inner outer ring has two rows of the inside grooved race of a V-shape in a transverse cross-section, the outside grooved race and the inside grooved race each having a race surface on which the circular rolling surface of the roller is allowed to roll through and a guide part to guide one of axially opposite ends of the roller. The inside circular surface of the outer ring is staggered or different in level on opposite sides of the outside grooved race to form the race surface greater than the guide part and the outside circular surface of the inner ring is staggered or different in level on opposite sides of the inside grooved race to form the race surface greater in wide dimension than the guide part.

With the turning bearing constructed as stated earlier, the separator of a quadrilateral in a transverse cross-section has the leading side and the tailing side each of which has the concaved surfaces to fit over the circular rolling surfaces of the rollers, the concaved surfaces lying symmetrically in a crisscrossed relation with each other. The concaved surfaces in the separator are contoured in arced or curved profiles in which the concaved surfaces bulge gradually as getting closer towards the central area or the bottom of the concaved surfaces. The peripheral sides of the quadrilateral extending around the concaved surfaces have the recesses of arched configuration in a transverse cross-section, providing lubricant passages. On the center of the concaved surfaces crisscrossed each other, the through-hole is provided which is enlarged in diameter at the opposite ends thereof so as to serve as a lubricant reservoir. Thus, even if the separator is incorporated in the raceway through the loading hole in a condition that the concaved surfaces are angularly displaced over 90 degrees or 180 degrees, the separator of the present invention may be charged into the raceway with keeping better contact condition with the circular rolling surfaces of the rollers irrespective of in which posture the separator is loaded. Thus, the separator can be easier installed into the raceway through a loading hole without the posture of the separator in mind. The roller is guided while rotating in the concaved surfaces with making contact with the separator at a narrow area near the axial middle of the circular rolling surface of the roller. As the concaved surfaces of the separator are placed in symmetry in two directions in perpendicular to each other, the separator is kept in the same contact condition with the circular rolling surface of the roller irrespective of in which posture or direction the separator is loaded in the raceway. The through-hole lying in the concaved surfaces serves as the lubricant reservoir and conjoins with the recesses on the periphery of the separator to help easier flowing of the lubricant through the raceways. The arcing bulge in the concaved surface prevents the circular rolling surface of the roller from the surface-to-surface contact with curved surface of the separator though depending on any relative askew-contact state of the roller with the separator, but keeps the roller on point contact with the concaved surface of the separator, thereby reducing the frictional resistance between them. Thus, the turning bearing of the present invention has the advantages of less frictional resistance on contact between the concaved surface of the separator and the circular rolling surface of the roller, and better assembling work of the separator into the bearing, and more mobility of lubricant between the rollers to improve the lubricating performance. According to the present invention, the concaved surfaces on the separator to fit over the circular rolling surfaces of the rollers are formed in perpendicular to each other in the crisscrossed relation and the separator has the raised portions whose tops are made flat at the four corners. Moreover, the concaved surface of the separator is narrow about the middle in the axial direction of the roller which fits into the separator, but radiates outward or splays out towards the axially opposite ends of the roller up to the overall dimensions of the separator. As a result, the separator of the present invention allows the rollers to enter in the loading hole in any arbitrary posture of two postures, allowing greater freedom of assembling of the separator into the loading hole thereby improving the assembling efficiency of the bearing.

DETAILED DESCRIPTION OF THE EMBODIMENT

Figure 1:
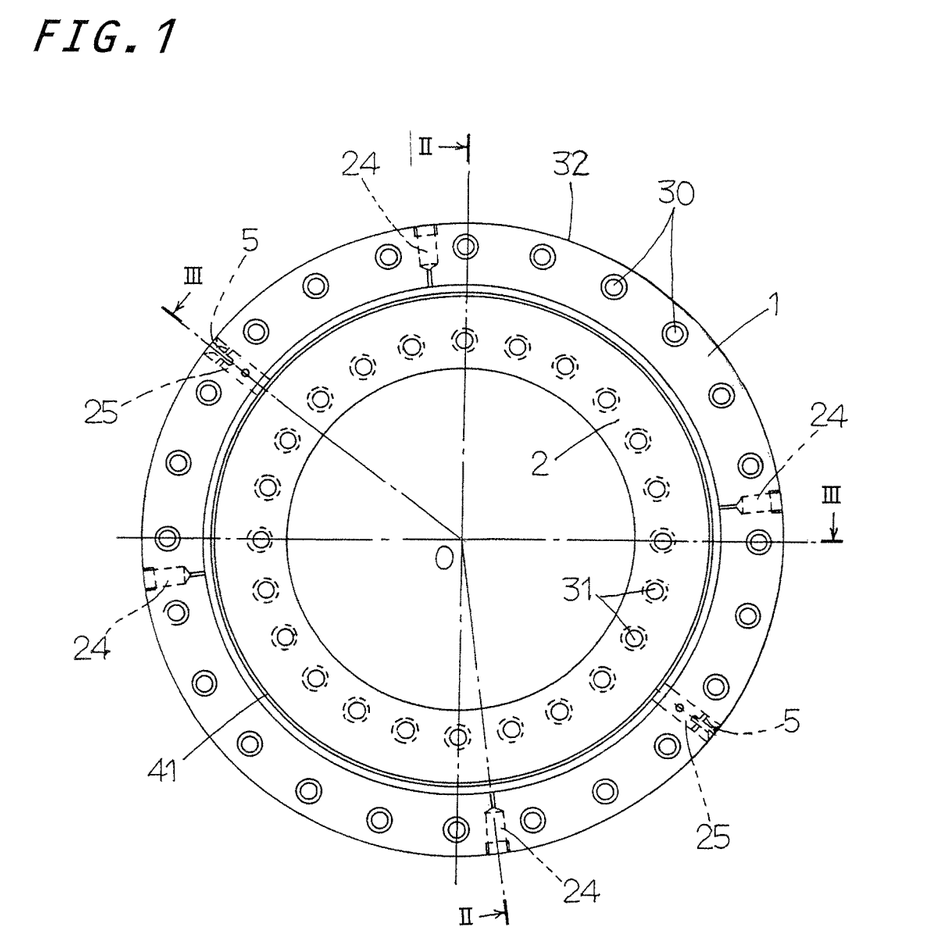
FIG. 1 is a view in front elevation of a preferred embodiment of a double-row angular roller bearing in a turning bearing equipped with a separator constructed according to the present invention.
Figure 2:
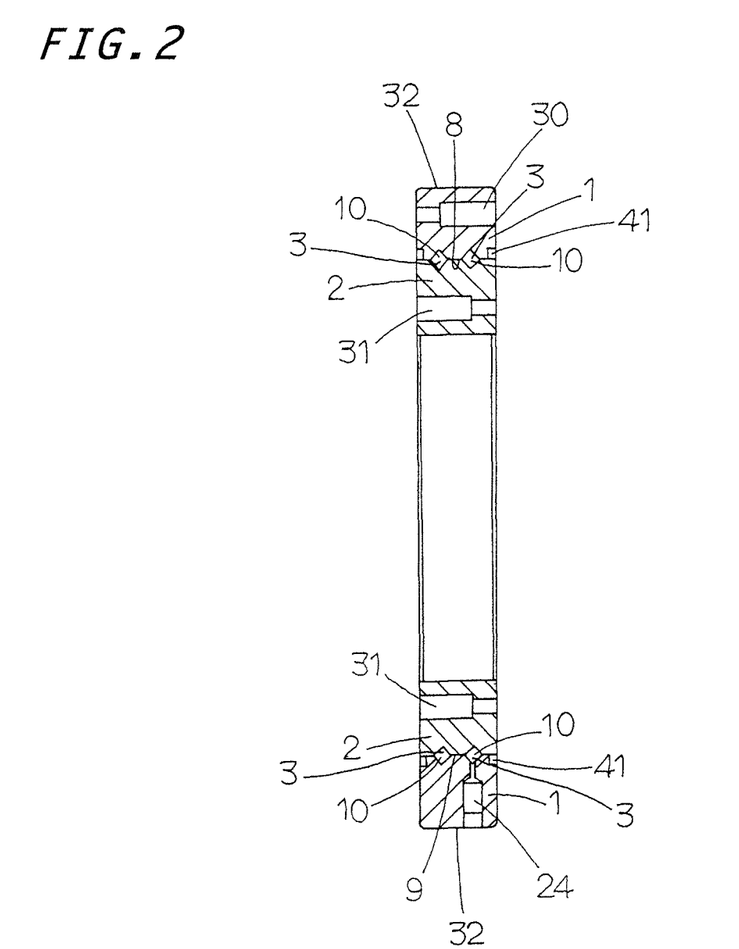
FIG. 2 is a view in transverse cross-section of the double-row angular roller bearing of FIG. 1, taken on the plane lying on the lines II-II of FIG. 1.
Figure 3:
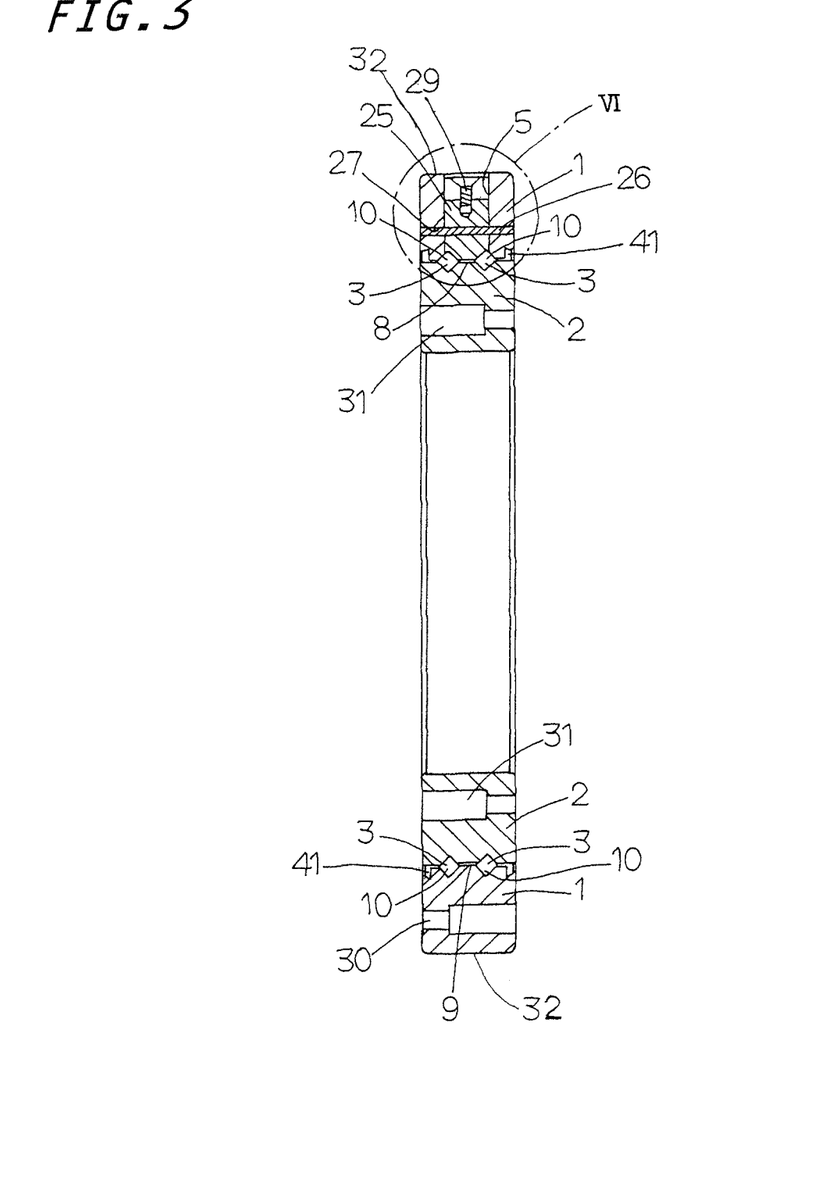
FIG. 3 is a view in transverse cross-section of the double-row angular roller bearing of FIG. 1 in which a loading hole is common to two outer grooved races, taken on the plane lying on the lines III-0-III of FIG. 1.
Figure 4:
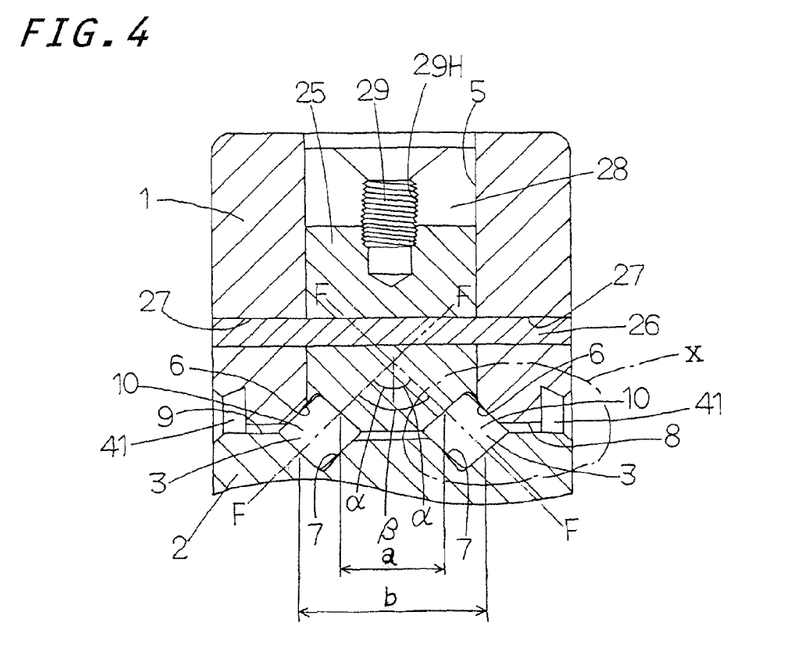
FIG. 4 is an enlarged view in transverse cross-section of an area encircled with a sign IV in FIG. 3.

The turning bearing equipped with a separator constructed according to the present invention will find extensive applications in relative turning, rocking and turning systems used in a diversity of machinery including semiconductor fabricating equipments, precision machines, measurement/inspection equipments, medical appliances, industrial robots, various assembling machines, transportation machines, machine tools, micromachines and so on. A preferred first embodiment of the turning bearing of the present invention will be explained in detail with reference to the accompanying drawings. Referring to FIGS. 1 to 4, the turning bearing of the present invention is in general composed of an outer ring 1, inner ring 2, and rollers 3 and separators 4 (see FIG. 5) lying in raceways 10 defined between the outer ring 1 and the inner ring 2, the separators 3 being disposed between the rollers adjoining each other. The turning bearing is a double-row angular-contact roller bearing in which either of the outer ring 1 and the inner ring 2, especially the outer ring 1 in the embodiment shown here, has a loading hole 5 to charge the rollers 3 and the separators 4 into the plural rows of raceways, especially two rows in the embodiment shown here, defined between grooved races 6 and 7 of V-shape in transverse section. With the outer ring 1, the outside grooved races 6 of V-shape in transverse cross-section are cut in an inside circular surface 8 of the outer ring 1. With the inner ring 2, the inside grooved races 7 of V-shape in transverse cross-section are cut in an outside circular surface 9 of the inner ring 2. In the embodiment discussed here, moreover, an angle α between a line of action F-F on the outside grooved race 6 and the inside grooved race 7 and a radial direction of the bearing axis, or a contact angle between a direction along which the load of the roller is born against the grooved races and a plane perpendicular to the bearing axis, is 45 degrees as shown in FIG. 4. As a result, a crossing angle β at which extended lines of lines of action F-F on the outside grooved races 6 and the inside grooved races 7 of the different rows intersect in perpendicular to each other is 90 degrees. The outer ring 1 and the inner ring 2 have some counterbored holes 30, 31 which are used to fasten the turning bearing to other components such as basements, instruments and so on. Though the grooved races 6, 7 in the angular-contact roller bearing may be placed in either of back-to-back arrangement and front-to-front arrangement, the grooved races 6, 7 in the angular-contact roller bearing of the present invention are designed in the back-to-back arrangement. With the back-to-back arrangement, as shown in FIG. 4, a distance b between center lines of race surfaces 15 in the inside grooved races 7 is larger than a distance a between center lines of race surfaces 13 in the outside grooved races 6. Moreover, the lines of action F-F of roller loads of the rollers 3 rolling through raceways 10 defined between the outside grooved races 6 and the inside grooved races 7 intersect each other outside the pitch circles of rollers 3. The angular-contact roller bearing of back-to-back arrangement is large in the distance between the lines of action of roller loads and, therefore, has a high load-carrying capacity against moment load.

According to the design specification in the embodied turning bearing of the present invention, for example, a diameter of the inside circular surface of the inner ring 2, or inside diameter of the ring 2 was 160 mm and a diameter of the outside circular surface of the outer ring 1, or outside diameter of the ring 1 was 295 mm. Widths or breadths of the outer ring 1 and the inner ring 2 were each 35 mm. The ratio of a diameter Da and an axial length Lr of the roller 3 was for example nearly 1 to 1, especially, the dimension φ of the diameter Da was 6 mm and the axial length Lr was slightly smaller than the dimension φ of the diameter Da. With the turning bearing of the present invention, the axially opposite sides of the bearing have circular slots 41 to snugly fit over dust-proofing sealing members which extends circumferentially to exclude dirt and foreign matters from circular clearance left between the outside circular surface of the inner ring 2 and the inside circular surface of the outer ring 2. The outer ring 1 has oiling holes 24. With the embodiment illustrated, there were provided four oiling holes 24 which were arranged around the outer ring 1 in a way any adjacent two holes were spaced angularly away from each other across, for example 90 degrees. Each oiling hole 24 had a diameter φ of, for example 2 mm and female threads to fit over a tubular screw driven from an outside circular surface 32 of the outer ring 1. With the embodied turning bearing of the present invention, the loading hole 5 was provided around the outer ring 1 at only one position out of the interference with the oiling holes 24. With the turning bearing with the separators constructed according to the present invention, a plurality of rollers 3 together with the separators 4 is charged or incorporated through the loading hole 5 which is thereafter closed with a closure 25. Moreover, the outer ring 1 as shown in FIG. 4 has a locking pin hole 27 extending across the loading hole 5. The closure 25 after having fit in the loading hole 5 is held in place with a locking pin 26 driven into the locking pin hole 27. An example of the closure 25 applicable to the turning bearing is described in Japanese Laid-Open Patent Application 2010-230 053. The closure 25 has an innermost end which is exposed to the grooved race 6 of the outer ring 1 and made to conform in shape to the grooved race 6. Moreover, the closure 25 has slits 28 extended axially in circular wall of the closure 25 and another slits extended circumferentially near the deep ends of the slits 28. The closure 25 has a threaded hole 29H at the outermost end opposite to the innermost end thereof. As a flat-head screw 29 is tightened or wedged into the threaded hole 29H, the closure 25 is expanded radially outwards along the slits 28 to firmly secure the closure 25 inside the loading hole 5 in the outer ring 1. The outermost end of the closure 25 is kept at a location receding below the outside circular surface 32 of the outer ring 1.

Referring to FIGS. 5 to 9, there are shown separators constructed according to the present invention and incorporated in the turning bearing. Especially, the separator 4 is distinctively constructed to make incorporation thereof into the bearing easier and more secure, thereby improving the assembling performance of the separator 4 through the loading hole 5. The separator 4, more especially, is surrounded with a peripheral surface 33 which form a substantially quadrilateral in a transverse cross-section perpendicular to the traveling direction of the separator 4, four sides 33S of the quadrilateral being envisaged coming into confronting or sliding contact with either of the outer ring 1 and the inner ring 2. The separator 4 has a leading side 4S and a trailing side 4S each of which is concaved to fit over a circular rolling surface 11 of the roller 3. Thus, the leading and trailing sides 4S are provided thereon with concaved surfaces 35 where a first concaved surface lying in parallel with an axis of the roller and a second concaved surface 35 lying in perpendicular to the first concaved surface are combined together in a crisscrossed relation. At the centers of the leading and trailing sides 4S, there is provided an oil reservoir of a through-hole 37 extending across the separator. The concaved surfaces 35 in the separator 4, when viewed in a transverse cross-section thereof, are each contoured in an arced or curved profile in which the concaved surface 35 bulges or rises gradually as getting closer towards circular edge of the central through-hole 37 to form arcing bulges 38 lying on every sides in crisscrossed relation with each other. On the sides 33S of the peripheral surface 33 spreading around the concaved surfaces 35 in the leading and trailing sides 4S of the separator 4, recesses 34 of arced configuration in a transverse cross-section are made, one to each side. Moreover, the through-hole 37 extending between the leading and trailing sides 4S of the separator is made larger in transverse cross-section at the leading and trailing sides 4S than at other major middle thereof. The concaved surface 35 to fit over the circular rolling surface 11 of the roller 3 is either of the directions parallel with or perpendicular to the axial direction of the roller 3. The leading and trailing sides 4S of the separator 4 have at their four corners raised portions 36 whose tops are made flat. Portions 39 protruding in the axial direction of the separator 4 to come into contact with the roller 3 are formed on the circular edge of the through-hole 37 at four locations lying on phantom lines connecting the center and four raised corners 36 of the separator 4. The concaved surface 35 of the separator 4 is narrow about the middle in the axial direction of the roller 3 which fits into the separator 4, but radiates outward or splays out towards each of the sides 33S of the quadrilateral to widen near the axially opposite ends 12 of the roller 3 up to the overall dimensions of the separator 4. More especially, the arced or curved profile of the concaved surface 35 is narrow at an area which fits over the axial middle of the roller 3, but diverges outwards to the overall dimensions of the separator 4 near the axially opposite ends 12 of the roller 3.

Specifically, the separator 4 is charged or loaded through the loading hole 5 into the raceway 10 defined between the outside grooved race 6 on the outer ring 1 and the inside grooved race 7 on the inner ring 2 in such a way that the separator 4 is interposed between adjoining rollers 3. To this end, the separator 4 is designed to have a substantially quadrilateral configuration surrounded with the peripheral surface 33 of four sides 33S each of which has a thickness in the traveling direction of the roller 3 enough to space out the rollers 3 apart from each other in the traveling direction of the rollers 3. The separator 4 is provided at the center thereof with the through-hole 37. That is, the separator 4 has the substantially quadrilateral configuration when viewed from the side of the concaved surfaces 35 to fit over the circular rolling surface 11 of the roller 3. The recesses 34 are made on the sides 33S of the peripheral surface 33 of the separator 4. On the leading and trailing sides 4S of the separator 4 to fit over the circular rolling surface of the roller 3, there are provided the concaved surfaces 35 which each extend in the direction of the circular rolling surface between the opposite sides 33S with arcing in transverse cross-section in conformity with circular rolling surface 11 of the roller 3, and cross at 90 degrees each other in a crisscrossed relation. The raised flats 36 are formed at four corners. The separator 4 is installed in the raceway 10 such that the peripheral surface 33 lies in opposition to both the guide parts 14, 16 and the race surfaces 13, 15 of the grooved races 6, 7 on the outer ring 1 and the inner ring 2. With the separator 4, more especially, each of the concaved surfaces 35 arcs in transverse cross-section between the sides of the peripheral surface 33 lying in opposition to the race surfaces 13, 15. The race surface 13 of the outside grooved race 6 is made in an inclined surface 21 and the race surface 15 of the inside grooved race 7 is made in an inclined surface 22. The concaved surface 35 is arched in transverse cross-section in conformity with the rolling surface 11 of the roller 3, as shown in FIGS. 6 and 7, and born against the roller 3 for rotation only at a narrow area near around the middle in the axial direction of the roller 3.

Figure 6:
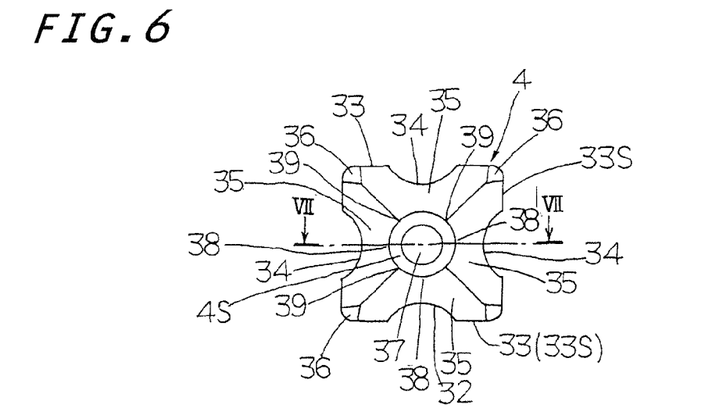
FIG. 6 is a view in front elevation showing any one of leading and trailing sides of the separator.
Figure 7:
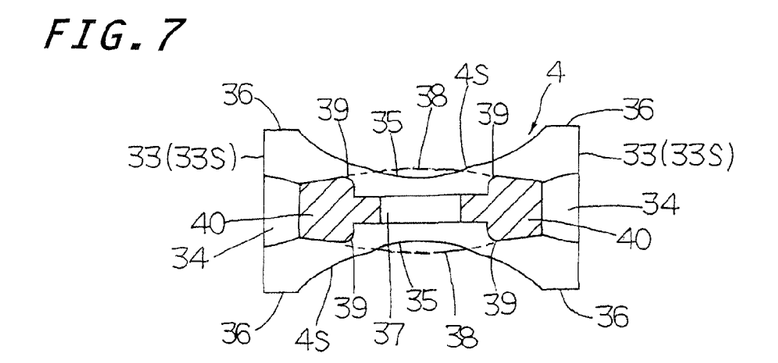
FIG. 7 is an enlarged view in transverse cross-section of the separator of FIG. 6, taken on the plane lying on the lines VII-VII of FIG. 6.
Figure 8:
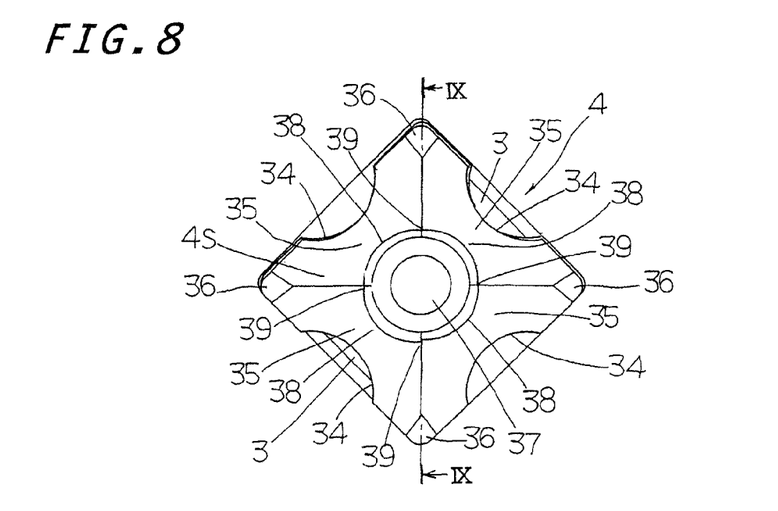
FIG. 8 is a view in front elevation showing the side of the separator to fit over the roller.
Figure 9:
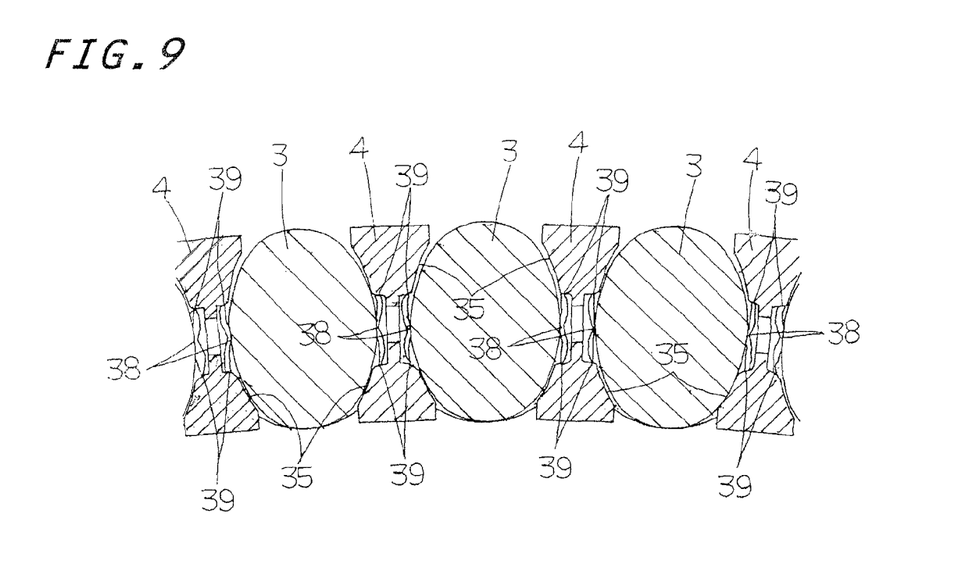
FIG. 9 is a view explanatory of disposition between the separator and the roller, taken on the plane lying on the lines IX-IX of FIG. 8 and seen from a through-hole of the separator.

The separator 4 has a major body 40 on which the concaved surfaces 35 as shown in FIG. 6 are formed in symmetry to make the crisscrossed relation around the central through-hole 37, ensuring the correct contacting condition with the rollers 3 irrespective of in which posture the separator 4 is loaded in the raceway 10. Moreover, the concaved surfaces 35 on the separator 4 are contoured in arced or curved profiles that the concaved surfaces 35 bulge or rise gradually to provide the arcing bulge 38 as their concavities get closer towards the centers thereof. It will be considered that the separator 4 comes into contact with the circular rolling surface 11 of the roller 3 in different contact conditions or postures. Considering the separator 4 comes into contact with the roller 3 in an inclined relation relative each other, the arcing bulge 38 makes only a point contact with the roller 3 in either of a circumferential direction and an axial direction the roller 3 depending on the tilted contact condition between the roller 3 and the separator 4, so that the arcing bulge 38 functions staving off the surface contact between the separator 4 and the roller 3 thereby keeping the contact condition reducing the frictional resistance encountered between the surfaces of the separator 4 and the roller 3. The recesses 34 on the sides 33S of the peripheral surface 33 around the separator 33 are made arced in transverse cross-section on the plane perpendicular to the axial direction of the separator 4. The through-hole 37 in the separator 4 is counterbored on the opposite sides of the separator 4 to have stepwise radially enlarged areas which serve as lubricant reservoirs. With the separator 4 constructed as stated just earlier, the flow of lubricant is made easier by combination of the central hole 37 with the recesses 34 on the peripheral 33. The circular rolling surface 11 of the roller 3 as shown in FIGS. 6 and 7 comes into contact with the separator 4 in the vicinity of the through-hole 37 lying at the center of the concaved surfaces 35 of the separator 4.

Figure 5:
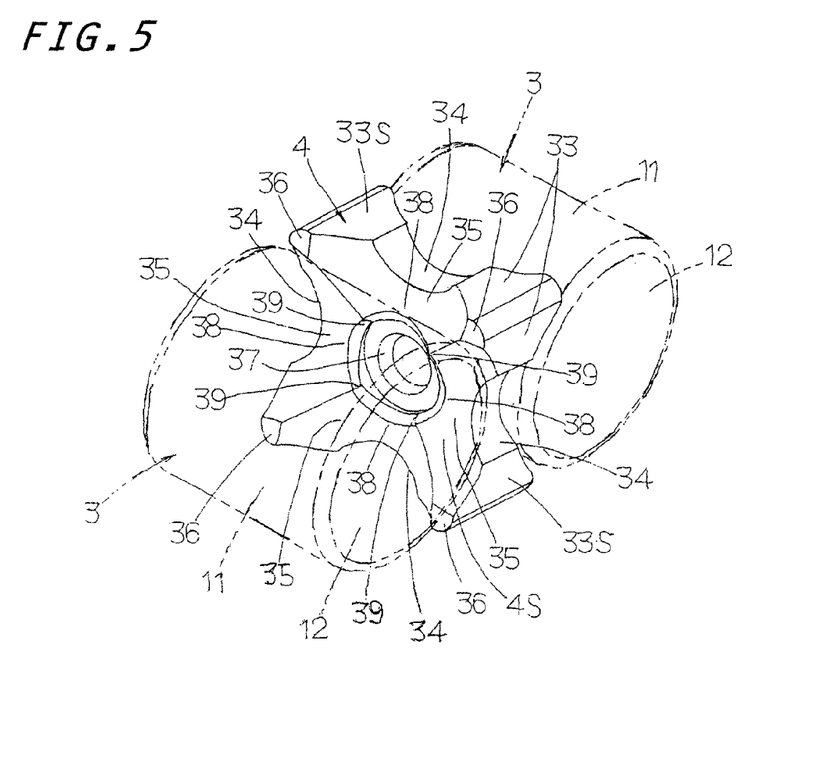
FIG. 5 is a view in perspective showing a preferred embodiment of a separator incorporated in the turning bearing.

With the separator 4 of the substantially quadrilateral configuration when viewed from the concaved surface 35 to fit over the roller 3, each side 33S of the quadrilateral was for example 5.95 mm and the four arced recesses 34 cut on the peripheral surface 33 were identical each other in dimension, for example each having a radial dimension of 1.5 mm. The concaved surfaces 35 crisscrossed each other to fit over the roller 3 were each made to have a radial dimension of for example 3.1 mm. The through-hole 37 counterbored at the opposite ends thereof had a diameter $\phi$ of, for example 1.5 mm at the axial middle area thereof and 2.5 mm at axially opposite counterbored ends. The raised portions 36 whose tops are made flat are at four corners of the separator 4 when viewed at the front of the separator 4. The concaved surfaces 35 of the separator 4, as intersecting in perpendicular to each other as shown in FIGS. 5 and 6, are narrow about the through-hole 37, but radiate outward or splay out towards each of the sides 33S to form four substantially triangular configurations each of which diverges from the location near the through-hole 37 towards the side 33S. More especially, the concaved surfaces 35 of the separator 4 at their sides 33S confront the circular rolling surface 11 of the roller 3 over wide area of the axial dimension of the circular rolling surface 11 of the roller 3. In other words, the separator 4 fits over the circular rolling surface across wider area near the axially opposite ends 12 of the roller 3 than about the middle in the axial direction of the roller 3. Thus, the concaved surface 35 splays out towards the side 33S to the dimension near the diameter of the axially opposite ends 12 of the roller 3.

With the separator 4 in the turning bearing, the concaved surface 35 to fit over the circular rolling surface 11 of the roller 3 has the arced or curved profile in transverse cross-section, the arced or curved profile in the axial direction of the roller 3 being raised in an arched fashion toward the circular rolling surface 11 around the center of the separator 4 to provide the arcing bulge 38. In case where any variation occurs in the pitch circle diameter of the roller or in the circular clearance between the roller 3 and the separator 4, the posture and/or inclination of the separator 4 relative to the roller 3 varies, thereby giving rise to any change of a contact location of the separator 4 with the roller 3. The contact location of the separator 4 lies near a ridge along which the adjoining concaved surfaces 35 merge with each other, varying across a range extending from the raised contact portion to a location near the peripheral surface 33 of the separator 4.

Nevertheless, the roller 3 and the arcing bulge 38 of the separator 4 keep functioning on point contact without causing any variation. Even if any circular clearance occurs between the roller 3 and the separator 4, the roller 3 and the separator 4 keep functioning on point contact. When the concaved surface 35 of the separator 4, as opposed to the arced or curved profile as stated earlier, has a linear profile extending in parallel with the axial direction of the roller 3, the circular rolling surface 11 of the roller 3 comes into line contact with the bottom of the concaved surface 35. When any variation occurs in the pitch circle diameter of the roller or in the circular clearance between the roller 3 and the separator 4, the contact phase between the roller 3 and the separator 4 varies from the line contact to the point contact. Moreover, as the separator 4 and the roller 3 make contact with each other at the location near their middle or center areas, the same separator 4 can be applied to the rollers 3 different in dimension even though the pitch circle diameter of the roller varies within a prescribed range. Thus, there is no need of preparing dedicated separators 4 for every roller different in dimension. In the embodied turning bearing in which, for example, the dimension of the roller was φ6×5.93 and the roller pitch circle diameter was 228.95 mm, the same separator 4 could be applied though the pitch circle diameter of the roller might varied within the range of ±100 mm. As there was no variation in the contact phase between the roller 3 and the separator 4, the contact phase could be kept stable during rotation of the bearing. As the separator 4 and the roller 3 came into contact with each other at the location near their middle or center areas, the skew phenomenon was hard to occur in which the roller 3 tilted relative to the traveling direction of the roller 3. It will be understood that the frictional resistance occurring between the circular rolling surface 11 of the roller 3 and the concaved surface 35 of the separator 4 becomes less in the point contact phase of small contact area than in the line contact phase.

Figure 10:
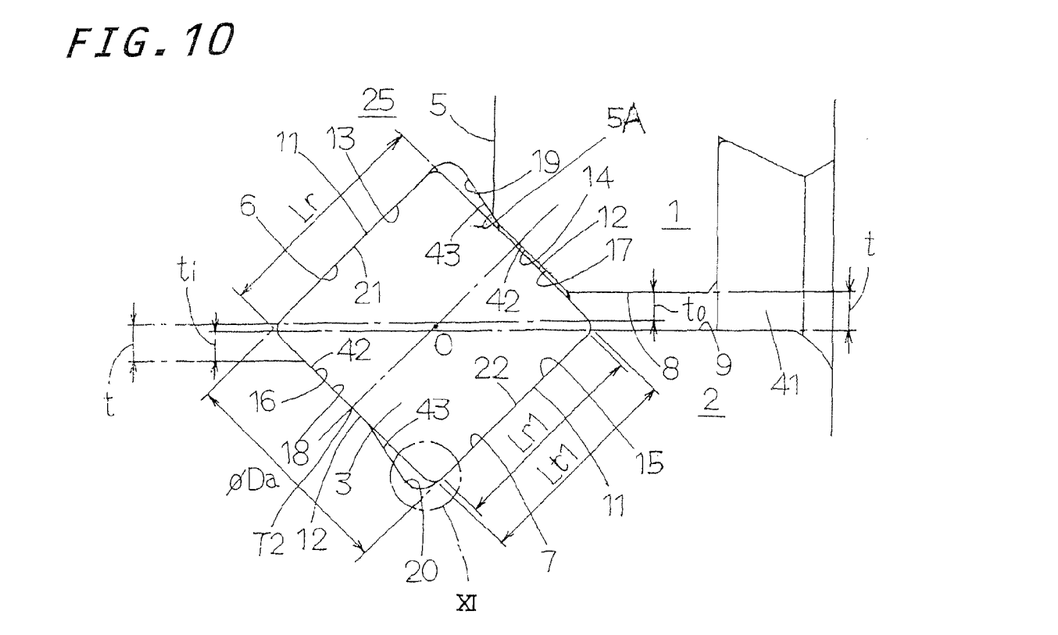
FIG. 10 is an enlarged view in transverse cross-section of an area encircled with a sign X in FIG. 4 to show a raceway defined between a grooved race cut in a circular inside surface of an outer ring and a grooved race cut in a circular outside surface of an inner ring.
Figure 11:
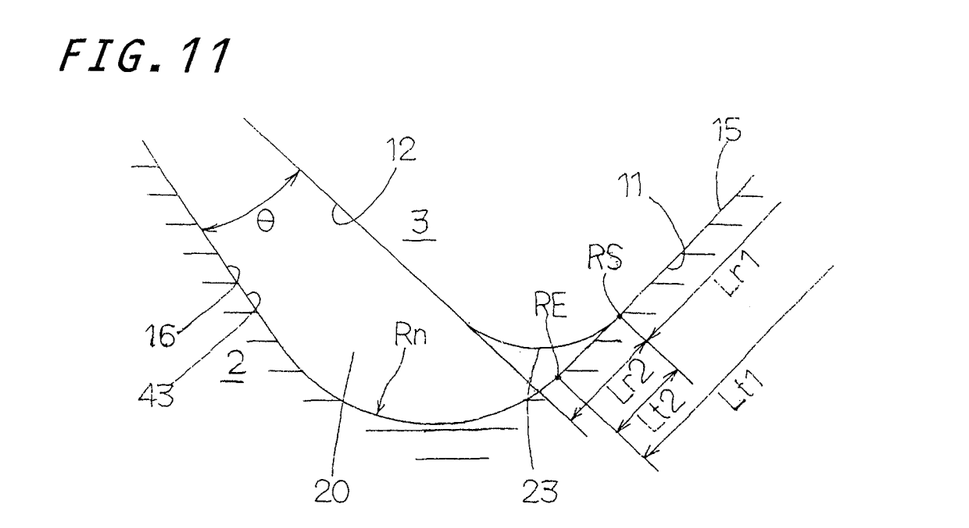
FIG. 11 is an enlarged view explanatory of an area encircled with a sign X I in FIG. 10.

The turning bearing constructed according to the present invention, as shown in FIGS. 4, 10 and 11, features that the inside circular surface 8 of the outer ring 1 is made staggered or different in level on opposite sides of the outside grooved race 6 formed on the inside circular surface 8 of the outer ring 1 while the outside circular surface 9 of the inner ring 2 is made staggered or different in level on opposite sides of the outside grooved race 7 formed on the outside circular surface 9 of the inner ring 2 so as to make greater the rolling-contact area of the race surfaces 13, 15 with the circular rolling surface 11 of the roller 3 and correspondingly less the contact area of the guide parts 14, 16 with the axially opposite ends of the roller 3. The outside grooved race 6 of the outer ring 1 has the V-shape in transverse cross-section, one side of the V-shape being the race surface 13 and the other being the guide part 14. The guide part 14 includes a relief side 19 for the grinding tool (not shown) in machining procedure and a guide surface 17 for guidance of any one of the axially opposite ends 12 of the roller 3. The inside grooved race 7 of the inner ring 2 in turn has the V-shape in transverse cross-section, one side of the V-shape being the race surface 15 and the other being the guide part 16. The guide part 16 includes a relief side 20 for the tool (not shown) in machining procedure and a guide surface 18 for guidance of the other one of the axially opposite ends 12 of the roller 3. Moreover, the outside grooved race 6 on the outer ring 1 is constituted with the race surface 13 on which the circular rolling surface 11 of the roller 3 rolls through, the race surface 13 lying in widthwise inner side of the outer ring 1, and the guide part 14 having the guide surface 17 on which any one of the axially opposite ends 12 of the roller 3 slides while rotating on its own axis, the guide part 14 lying in widthwise outer side of the outer ring 1. The inside grooved race 7 on the inner ring 2 is constituted with the race surface 15 on which the circular rolling surface 11 of the roller 3 rolls through, the race surface 15 lying widthwise outer side of the inner ring 2, and the guide part 16 having the guide surface 18 on which any one of the axially opposite ends 12 of the roller 3 slides while rotating on its own axis, the guide part 14 lying widthwise inner side of the outer ring 2. The guide parts 14, 16 of the outside grooved race 6 and the inside grooved race 7 include the guide surfaces 17, 18 formed on the inside circular surface 8 of the outer ring 1 and the outside circular surface 9 of the inner ring 2, respectively, to guide the axially opposite ends of the roller 3, and the relief sides 19, 20 reaching the bottoms of the outside grooved race 6 and the inside grooved race 7, respectively. With the outer ring 1, moreover, the inside circular surface 8 lying on the side of the race surface 13 is more biased radially inwards toward the center of the ring 1 than the inside circular surface 8 lying on the side of the guide surface 17, so that the inside circular surface 8 on the outer ring 1 is made staggered or different in level on opposite sides of the outside grooved race 6 to make greater the race surface 13 than the effective contact length of the circular rolling surface 11 of the roller 3 and correspondingly less the guide part 14 in width than race surface 13. With the inner ring 2, the outside circular surface 9 lying on the side of the race surface 15 is more biased radially outwards away from the center of the ring 2 than the outside circular surface 9 lying on the side of the guide surface 18, so that the outside circular surface 9 on the inner ring 2 is made staggered or different in level on opposite sides of the inside grooved race 7 to make greater the race surface 15 than the effective contact length of the circular rolling surface 11 of the roller 3 and correspondingly less the guide part 16 in width than race surface 13.

The inside circular surface 8 of the outer ring 1 lying widthwise inside of the ring 1 is closer to the center 0 of the roller 3 rolling on the grooved race 6 than the inside circular surface 8 lying widthwise outside of the ring 1. Moreover, the outside circular surface 9 of the inner ring 2 lying widthwise outside of the ring 2 is closer to the center 0 of the roller 3 rolling on the grooved race 6 than the outside circular surface 9 lying widthwise inside of the ring 2. As the result of the construction as stated just earlier, there is a radial difference or gap t0 in level between the inside circular surface 8 lying on a mounting surface of the outer ring 1 and the inside circular surface 8 flanked by the grooved races 6. There is a radial difference or gap ti in level between the outside circular surface 9 lying on a mounting surface of the inner ring 2 and the outside circular surface 9 flanked by the grooved races 7. In addition, the effective contact length Lt1 common to the race surface 13 of the outside grooved race 6 and the race surface 15 of the inside grooved race 7 is made greater than the effective contact length Lr1 of the roller 3 while the widthwise dimension of each of the guide parts 14, 16 in the outer ring 1 and the inner ring 2 is made longer than Da/2, but shorter than the diameter Da of the roller 3. On the other hand, the guide surfaces 17, 18 in the guide parts 14, 16 of the outer ring 1 and the inner ring 2 are made in slant surfaces 42, each of which slants to make a right angle relative to the rotating center 0 of the roller 3 and has a widthwise dimension spreading across the rotating center 0 of the roller 3 over a length enough to prevent the skew of the roller 3, but Da/2 or less.

With the turning bearing of the present invention, a distance t of a clearance left between the inside circular surface 8 of the outer ring 1 and the outside circular surface 9 of the inner ring 2 is kept constant across the overall widths of the outer ring 1 and the inner ring 2 with the exception of the locations of the grooved races 6, 7 and the circular slot to snugly fit over a dust-proofing sealing member. The relief sides 19, 20 are cut in the guide surfaces 17, 18 circularly of the outside grooved race 6 and the inside grooved race 7 in adjacency to the race surfaces 13, 15. The relief sides 19, 20 each have a widthwise dimension of less than Da/2 in the radial direction of the roller 3. Relief spaces defined between the relief sides 19, 20 and the circular rolling surface 11 of the roller 3 incorporated in the raceway 10 have wedged shape when viewed in a transverse cross-section taken on the plane lying on the radial direction of the bearing. The relief sides 19, 20 as shown in FIG. 11 extend from the guide surfaces 17, 18 away from the axially opposite ends of the roller 3 at angles θ relative to the axially opposite ends of the roller 3. Upon simultaneous machining of the guide parts 14, 16 and the race surfaces 13, 15 on the outer ring 1 and the inner ring 2, the relief sides 19, 20 are made with tapered surfaces 43 extending across the widthwise dimension of Da/2 or less in the radial direction of the roller 3. More especially, each of the tapered surfaces 43 extends towards the race surface 13 or 15 with more inclination than in the guide surfaces 17 or 18 to form the relief space of the wedged shape in transverse cross-section. In addition, the tapered surfaces 43 are each rounded at a location crossing with an extension of the race surface 13 or 15. In the embodiment, the angle θ was 12 degrees. The arced shape at the locations where the relief sides 19, 20 cross with the race surfaces 13, 15, as shown in FIG. 11 had the radius of curvature of 0.5 mm at the maximum. The depth of the relief sides 19, 20 below the guide surfaces 17, 18 was less than 10% of the diameter Da of the roller 3, especially 7.5%, namely 0.45 mm. With the other version of the turning bearing in which the grooved races may be designed in front-to-front arrangement, an opening 15A of the loading hole 15 exposed to the raceway 10 in the outer ring 1 as shown in FIG. 10 lies across the overall width of the race surface 13 and the relief side 19 in the guide surface 17 in such a relation that an edge surrounding the opening 15A is well within the range of the relief side 19 apart away from the guide surface 17. As the result of the construction as stated just earlier, the closure 25, after having fit into the loading hole 5, is free of engagement or collision with the axially opposite ends of the roller 3 at an innermost edge thereof exposed to the raceway 10, so that the rollers 3 are allowed to roll smoothly without falling into the opening 15A or getting caught at the closure 25.

Figure 12:
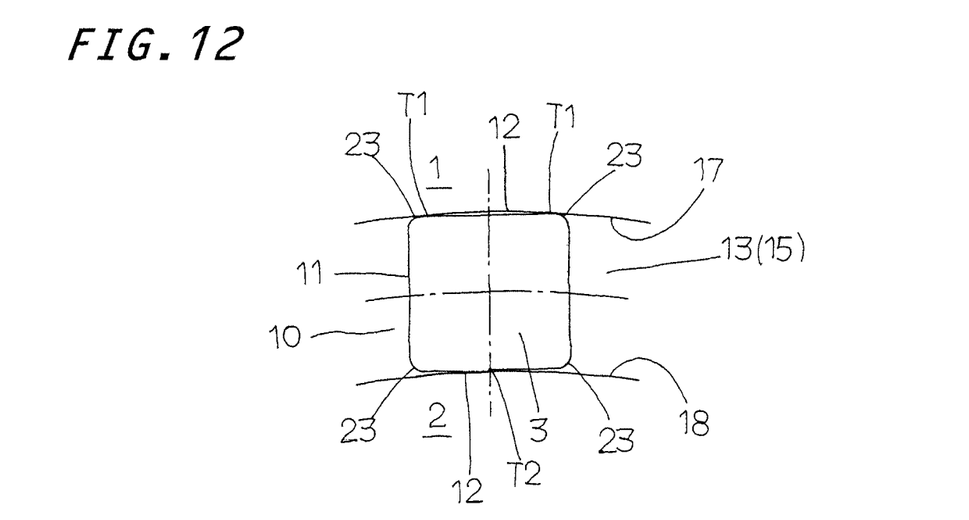
FIG. 12 is a view in perspective showing the roller rolling through the raceway defined between the grooved race on the circular inside surface of the outer ring and the grooved race cut on the circular outside surface of the inner ring.

With the turning bearing of the present invention, as shown in FIGS. 10 and 11, the effective contact length Lt1 of the race surface 13, 15 is designed longer than the effective contact length Lr1 of the roller 3. Now considering that the effective contact length of the roller 3 is Lr1, the effective contact length of the race surface 13, 15 is Lt1 and the axial length of a rounded bevel 23 of the roller 3 is Lr2, the relations of them are Lr1<Lt1 and Lt1<Lr1+2×Lr2. Moreover, an end or end point RE, lying nearby guide part 14, 16, of the effective contact area of the race surface 15 is closer to the any one of the axially opposite ends 12 of the roller 3 than the outset RS of the rounded bevel 23 on the roller 3 and lies within the dimensional range of the rounded bevel 23. When the length Lt2 is expressed as the length of from the outset RS of the rounded bevel 23 of the roller 3 to the end or end point RE of the effective contact area on the race surface 13, 15, the relation between Lt2 and Lr2 is Lt2<Lr2. With the race surface 13 of the outer ring 1 and the race surface 15 of the inner ring 2, more especially, the end RE continuing with the relief side 19, 20 to form the beginning of the grooved race 13, 15 is closer to the any one of the axially opposite ends 12 of the roller 3 than the outset RS of the rounded bevel 23 on the roller 3 and lies within the dimensional range of the rounded bevel 23. As shown in FIGS. 10 and 12, the end 12 of the roller 3 sliding contact with the outside grooved race 6 in the outer ring 1 is guided while born against the guide surface 17 on substantially point contact phase at two contact locations T1 diametrically opposite circumferential edges of the roller 3. Another end 12 of the roller 3 sliding contact with the inside grooved race 7 of the inner ring 2 is guided while born against the guide surface 18 on substantially line contact phase at a single contact location T2 lying on the rotating center 0 of the roller 3.

What is claimed is:

1. A turning bearing comprising: an outer ring provided on an inside circular surface thereof with an outside grooved race, an inner ring provided on an outside circular surface thereof with an inside grooved race in opposition to the outside grooved race of the outer ring, a plurality of rollers lying in a raceway defined between the outside grooved race and the inside grooved race to circulate through the raceway while bearing a load as the outer ring and the inner ring rotate relative to each other, a plurality of separators lying in the raceway in an arrangement interposed between the rollers adjoining each other, and a closure closing a loading hole provided in either of the outer ring and the inner ring for charging the raceway with the rollers and the separators, wherein the separator has a substantially quadrilateral in a transverse cross-section perpendicular to a traveling direction of the separator of which a peripheral surface is in opposition to the outer ring and the inner ring, wherein the separator has a leading side and a trailing side each of which is concaved to fit over a circular rolling surface of the roller to thereby provide concave surfaces lying either in parallel with and in-perpendicular to an axis of the roller, the concave surfaces being combined together in a crisscrossed relation, the separator having a through-hole extending across the separator at centers of the leading and trailing sides, and wherein the concave surfaces in the separator are contoured in arced or curved profiles in which the concave surfaces bulge or rise gradually towards a circular edge of the through-hole to form arcing bulges at bottoms of the concave surfaces lying in the crisscrossed relation with each other.

2. The turning bearing constructed as defined in claim 1, wherein recesses of arced configuration in the transverse cross-section are provided on a peripheral surface extending around the concave surfaces in the leading and trailing sides of the separator.

3. The turning bearing constructed as defined in claim 1, wherein the through-hole extending between the leading side and trailing side of the separator is larger in diameter at the leading side and trailing sides than in a middle portion thereof.

4. The turning bearing constructed as defined in claim 1, wherein the leading side and trailing side of the separator have at four corners raised portions having tops that are flat.

5. The turning bearing constructed as defined in claim 1, wherein the concave surface of the separator is narrow about a middle area in the axial direction of the roller which fits into the separator, but radiates outward or splays out towards each of the sides of the quadrilateral to widen near the axially opposite ends of the roller up to an overall dimension of the separator.

6. A turning bearing comprising:

an outer ring provided on an inside circular surface thereof with an outside grooved race, an inner ring provided on an outside circular surface thereof with an inside grooved race in opposition to the outside grooved race of the outer ring, a plurality of rollers lying in a raceway defined between the outside grooved race and the inside grooved race to circulate through the raceway while bearing a load as the outer ring and the inner ring rotate relative to each other, a plurality of separators lying in the raceway in an arrangement interposed between the rollers adjoining each other, and a closure closing a loading hole provided in either of the outer ring and the inner ring for charging the raceway with the rollers and the separators, wherein the separator has a substantially quadrilateral in a transverse cross-section perpendicular to a traveling direction of the separator of which a peripheral surface is in opposition to the outer ring and the inner ring, wherein the separator has a leading side and a trailing side each of which is concaved to fit over a circular rolling surface of the roller to thereby provide concave surfaces lying either in parallel with and in perpendicular to an axis of the roller, the concave surfaces being combined together in a crisscrossed relation, the separator having a through-hole extending across the separator at centers of the leading and trailing sides, and wherein the outer ring has two rows of the outside grooved race of a V-shape in a transverse cross-section and the inner ring has two rows of the inside grooved race of a V-shape in a transverse cross-section, the outside grooved race and the inside grooved race each having a race surface on which the circular rolling surface of the roller is allowed to roll through and a guide part to guide one of axially opposite ends of the roller, and wherein the inside circular surface of the outer ring is staggered or different in level on opposite sides of the outside grooved race to form the race surface greater than the guide part and the outside circular surface of the inner ring is staggered or different in level on opposite sides of the inside grooved race to form the race surface greater in a wide dimension than the guide part.

* * * * *